(12) United States Patent
Kim

(10) Patent No.: US 8,578,905 B2
(45) Date of Patent: Nov. 12, 2013

(54) ENGINE HAVING VARIATION VOLUME CRANK CASE

(75) Inventor: Suc Tae Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 299 days.

(21) Appl. No.: 13/191,147

(22) Filed: Jul. 26, 2011

(65) Prior Publication Data

US 2012/0145110 A1    Jun. 14, 2012

(30) Foreign Application Priority Data

Dec. 8, 2010    (KR) .......................... 10-2010-0124949

(51) Int. Cl.
*F16F 15/20*    (2006.01)

(52) U.S. Cl.
USPC ........................................ 123/192.2; 123/572

(58) Field of Classification Search
USPC ....................................................... 123/192.2
See application file for complete search history.

(56) References Cited

U.S. PATENT DOCUMENTS 4,696,267 A * 9/1987 Kohno et al. .............. 123/192.2

* cited by examiner

*Primary Examiner* — Noah Kamen
(74) *Attorney, Agent, or Firm* — Morgan, Lewis & Bockius LLP

(57) ABSTRACT

An engine having a crank case of a variable volume may include a crankshaft that may be disposed in a crank case and may be connected to a piston through a connecting rod, which reciprocate in a cylinder, a balance shaft that may be disposed in the crank case and may be operated by the crankshaft, a chamber that may be extended from the crank case, and a balance weight that may be formed on the balance shaft and selectively opens or closes a fluid communication between the chamber and the crank case according to a position of the piston.

7 Claims, 8 Drawing Sheets

ENGINE HAVING VARIATION VOLUME CRANK CASE

CROSS-REFERENCE TO RELATED APPLICATION

The present application claims priority to Korean Patent Application No. 10-2010-0124949 filed in the Korean Intellectual Property Office on Dec. 8, 2010, the entire contents of which is incorporated herein for all purposes by this reference.

BACKGROUND OF THE INVENTION

1. Field of the Invention

The present invention relates to an engine having a crank case of a variable volume that varies volume of the crank case according to movements of a piston.

2. Description of Related Art

Illustrated as one example, a blow by gas that escapes through a fine gap between a piston and a cylinder is formed during a combustion of an engine, if it is exhausted to the outside, the atmosphere pollution is caused thereby, and if the blow by gas is inappropriately handled, an interior pressure of the crank case is increased and the engine can be exploded thereby.

The blow by gas that is formed during the combustion of the engine is transferred to a head cover through a blow by passage that is formed by penetrating a cylinder block and a cylinder head from the crank case. The blow by gas that flows into the head cover passes a baffle plate to filter oil of the blow by gas is again supplied to an intake system through a PCV valve (Positive Crank case Ventilation Valve) and a breather, and then it is supplied into the combustion chamber again.

If the blow by gas is not circulated to the intake system to be combusted, the pressure increment of the crank case can cause the engine to be fail. The blow by gas is to be recirculated through a blow by passage of the cylinder block and the cylinder head between the crank case and the head cover so as to secure smooth flowing of the blow by gas. For this purpose, it is necessary to enlarge the crank case or widen a cross-section of the blow by gas passage.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to provide an engine having a crank case of a variable volume having advantages of varying a volume according to a movement of a piston to absorb a pressure variation.

In an aspect of the present invention, the engine having a crank case of a variable volume, may include a crankshaft that may be disposed in a crank case and may be connected to a piston through a connecting rod, which reciprocate in a cylinder, a balance shaft that may be disposed in the crank case and may be operated by the crankshaft, a chamber that may be extended from the crank case, and a balance weight that may be formed on the balance shaft and selectively opens or closes a fluid communication between the chamber and the crank case according to a position of the piston.

The crankshaft may include a drive gear and the balance shaft may include a driven gear that may be engaged with the drive gear.

The chamber may be fluid-connected to the crank case through an inlet, the balance shaft may be disposed at a side of the inlet, and the balance weight may be formed to may have a half circle shape along an exterior circumference direction of the balance shaft.

The balance weight may have an equal radial width along the exterior circumference of the balance shaft to rotatably contact with the inlet.

The chamber may be disposed in a length direction of the crankshaft to be connected to the crank case, the inlet may be formed between the chamber and the crank case in a length direction of the balance shaft, and the balance weight may be disposed in a length direction of the balance shaft corresponding to the inlet.

The fluid communication between the chamber and the crank case may be closed when the piston may be at a top dead center.

The fluid communication between the chamber and the crank case opens when the piston may be at a bottom dead center.

In an exemplary embodiment of the present invention, the chamber is formed at one side of the crank case and the chamber communicates with the crank case through the balance weight, wherein the volume of the crank case is varied by the movement of the piston such that pressure variation in the crank case is absorbed. Accordingly, the blow by gas can be effectively recirculated without enlarging the volume of the crank case or the blow by passage in an exemplary embodiment.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
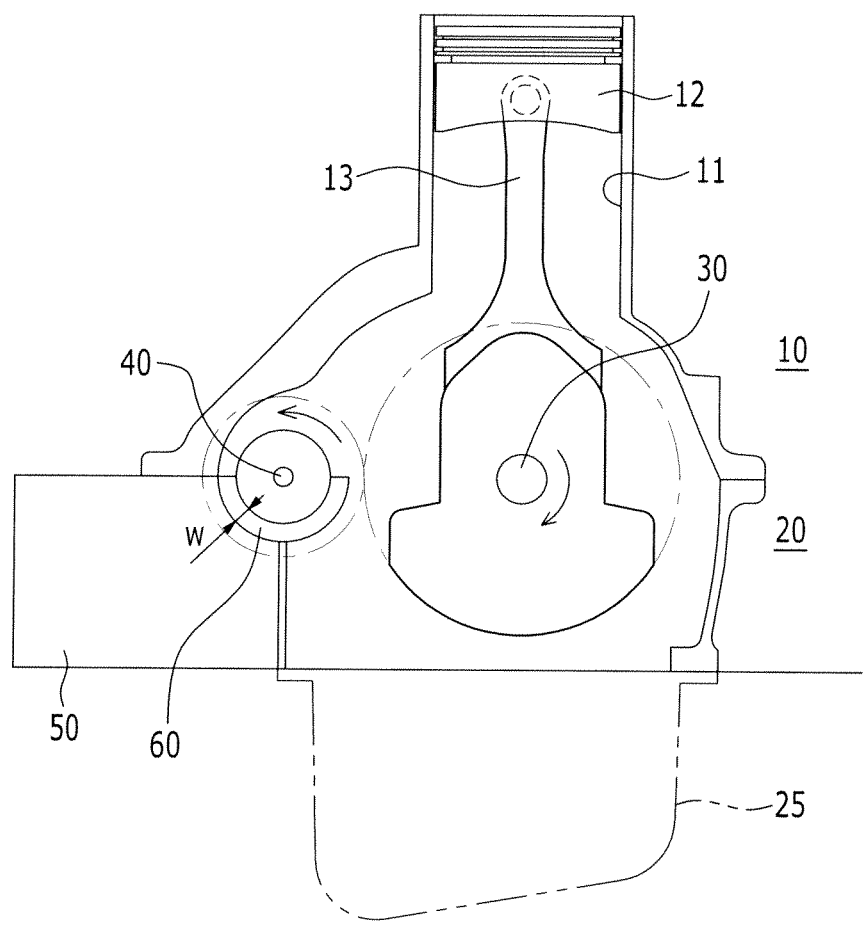
FIG. 1 is a cross-sectional view showing a condition that a piston rises in an engine having a crank case of a variable volume according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

FIG. 1 is a cross-sectional view showing a condition that a piston rises in an engine having a crank case of a variable volume (for convenience, hereinafter 'engine') according to an exemplary embodiment of the present invention. Referring to FIG. 1, an engine 1 according to an exemplary embodiment includes a cylinder block 10 having a cylinder 11, a crank case 20 that is connected to a lower portion of the cylinder block 10, and an oil fan 25 that is connected to a lower portion of the crank case 20 to supply oil.

The cylinder block 10 can have two cylinders, three cylinders, or four cylinders depending on the number of the cylinder 11. The multi cylinder engine 1 has its own phase of the piston 12 per cylinder so as to balance and set combustion order. The inherent movement of the piston 12 affects an interior pressure of the crank case 20 or offsets an interior pressure thereof through the up/down operation of the piston 12.

For example, in a case of 3 cylinder engine, because a crankshaft has a phase difference of 120 degrees, while one piston rises and tow pistons descends, a pressure within the crank case fluctuates.

In a case of 2 cylinder engine, there is no phase difference between cylinders and two pistons respectively moves up and down such that a pressure variation is formed as much as a stroke of a piston.

The two cylinder engine is exemplarily described, an engine 1 includes a crankshaft 30 that is disposed in a crank case 20 to be connected to a piston 12 through a connecting rod 13 moving up and down in a cylinder 11, and a balance shaft 40 that is disposed in the crank case 20 to be rotated by the crankshaft 30.

Figure 2:
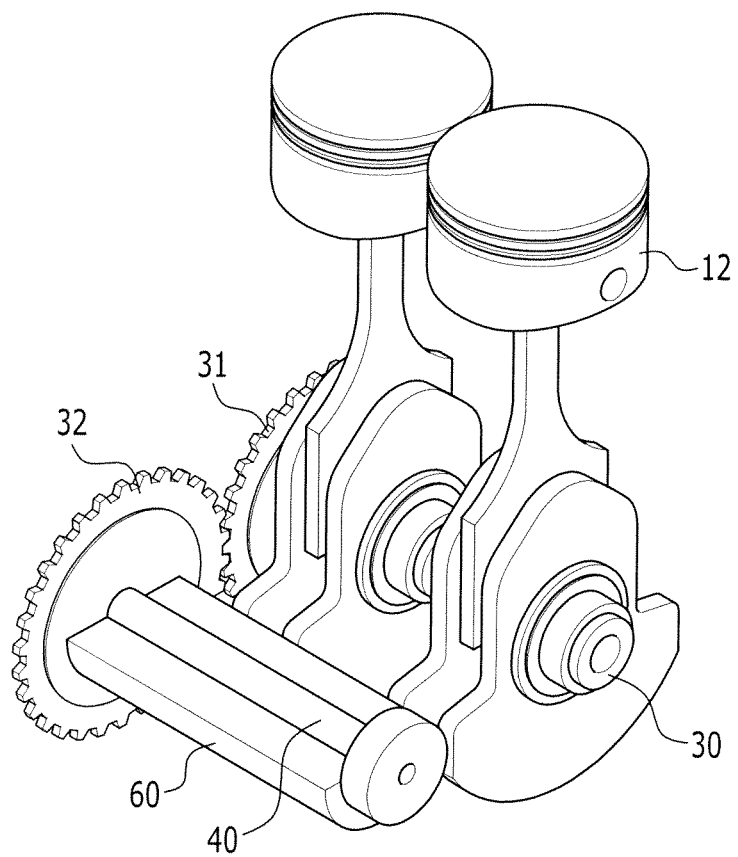
FIG. 2 is a perspective view showing a power delivery structure of a crankshaft and a balance weight of the FIG. 1.

FIG. 2 is a perspective view showing a power delivery structure of a crankshaft and a balance weight of the FIG. 1. Referring to FIG. 1 and FIG. 2, the balance shaft 40 includes a balance weight 60 that is formed outside to compensate NVH (Noise vibration and harshness) characteristic of two cylinder engine 1.

A drive gear 31 is disposed at one side of the crankshaft 30, and a driven gear 32 is disposed at the balance shaft 40 to be engaged with the drive gear 310. The drive gear 31 is engaged with the driven gear 32 such that the balance shaft 40 rotates according to a rotation of the crankshaft 30.

Referring to FIG. 1, the engine 1 includes a chamber 50 that is extended from the crank case 20. The balance weight 60 is disposed at the balance shaft 40 to connect or disconnect the chamber 50 with the crank case 20.

Figure 3:
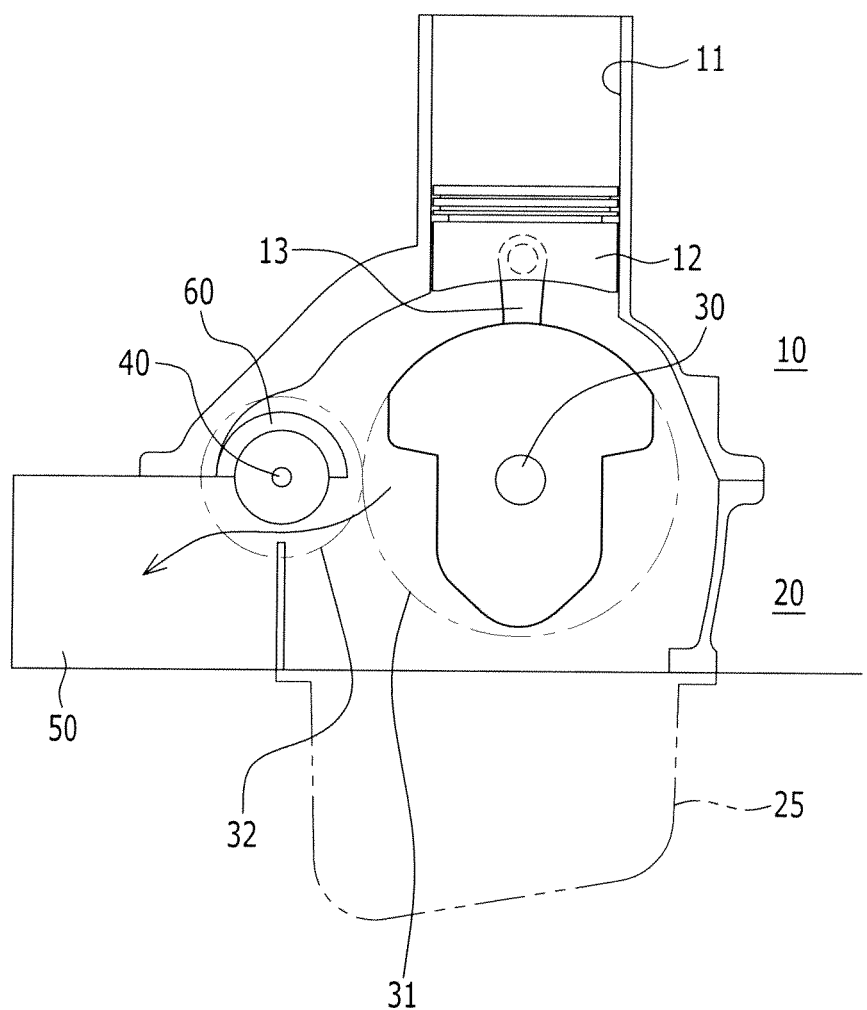
FIG. 3 is a cross-sectional view showing a condition that a piston descends in an engine shown in the FIG. 1.

FIG. 3 is a cross-sectional view showing a condition that a piston descends in an engine shown in the FIG. 1. Referring to FIG. 3, if the crankshaft 30 rotates by the up and down movement of the piston 12, the balance shaft 40 rotates through the drive gear 31 and the driven gear 32 to improve a NVH characteristic through a balancing function of the balance weight 60.

At the same time, the balance weight 60 of the balance shaft 40 controls the fluid communication of the chamber 50 with the crank case 20. Accordingly, the variation pressure that is formed in the crank case 20 according to the phase difference of the piston 12 can be absorbed by the chamber 50.

Figure 4:
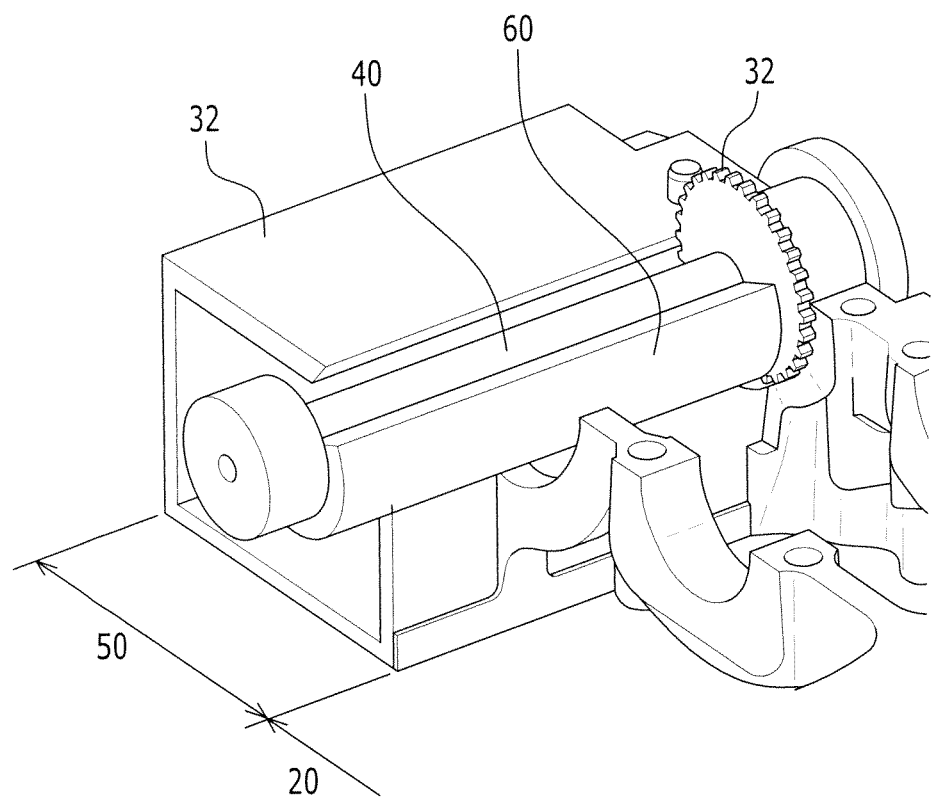
FIG. 4 is a perspective view showing a condition that a balance weight is disposed in a chamber.

FIG. 4 is a perspective view showing a condition that a balance weight is disposed in a chamber. Referring to FIG. 4, the chamber 50 is connected to the crank case 20 through the inlet 51 to correspond to the balance shaft 40 such that the balance shaft 40 opens/closes the inlet 51.

The balance weight 60 is mounted on an external circumference of the balance shaft 40 to have a half circle shape along an exterior circumference of the balance shaft 40. Accordingly, while the balance shaft 40 rotates, the balance weight 60 closes or opens the inlet 51.

That is, as shown in FIG. 3, while the balance weight 60 becomes distant from an inlet 51, the balance shaft 40 is exposed to the inlet 51. In this case, because the balance weight 60 opens the inlet 51, the chamber 50 communicates with the crank case 20 through the inlet 51.

Also, the balance weight 60 has an equal radial width (W, FIG. 1) along an exterior circumference of the balance shaft 40. That is, the balance weight 60 has an equal size in a diameter direction along the exterior circumference of the balance shaft 40 such that the inlet 51 is closed while the balance weight 60 contacts the inlet 51.

Referring to FIG. 4, the chamber 50 is formed in a length direction of the crankshaft 30 to be connected to the crank case 20 corresponding to the crank case 20. The inlet 51 is formed between the chamber 50 and the crank case 20 in a length direction of the balance shaft 40 disposed parallel to the crankshaft 30. The balance weight 60 is disposed on the inlet 51 in a length direction of the balance shaft 40 corresponding to the inlet 51.

Figure 5:
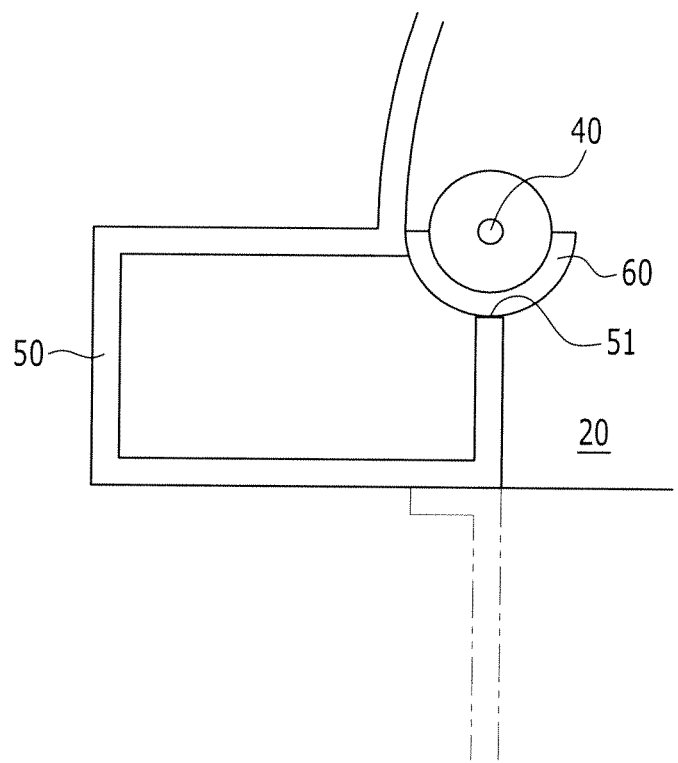
FIG. 5 to FIG. 8 show operational states of a balance weight in an inlet.

FIG. 5 to FIG. 8 show operational states of a balance weight in an inlet. As shown in FIG. 5, when the piston 12 is at a top dead center, the balance weight 60 disposed on the balance shaft 40 completely closes the inlet 51. Accordingly, a pressure loss that is formed during the rise of the piston 12 is minimized in the crank case 20. The crank case 20 can minimize a pressure loss by reducing a pressure variation volume as much as that of the chamber 50.

Figure 6:
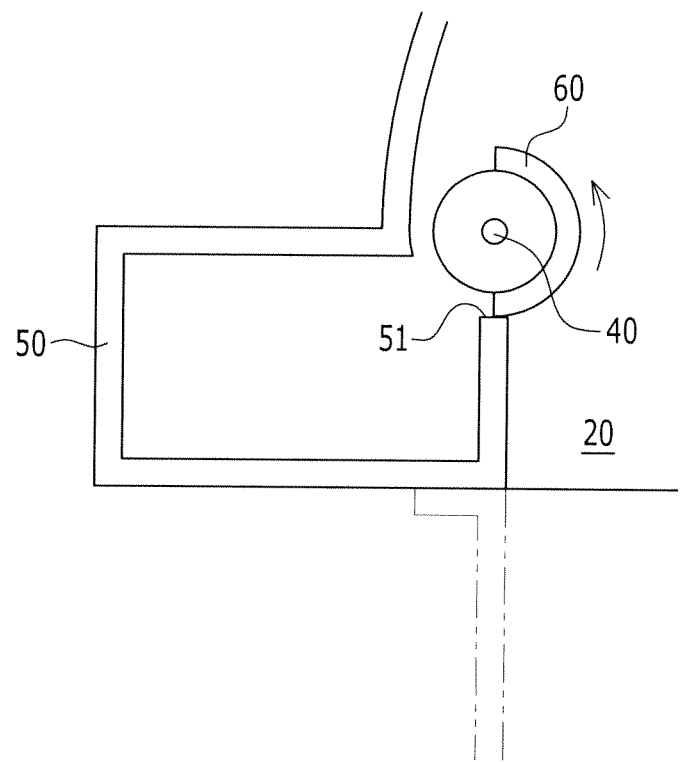

As shown in FIG. 6, if the piston 12 descends from the top dead center, the balance weight 60 of the balance shaft 40 rotates to start opening the inlet 51. Accordingly, the pressure within the crank case 20 that starts to be formed during the descent of the piston 12 is absorbed by the chamber 50 through the inlet 51.

Figure 7:
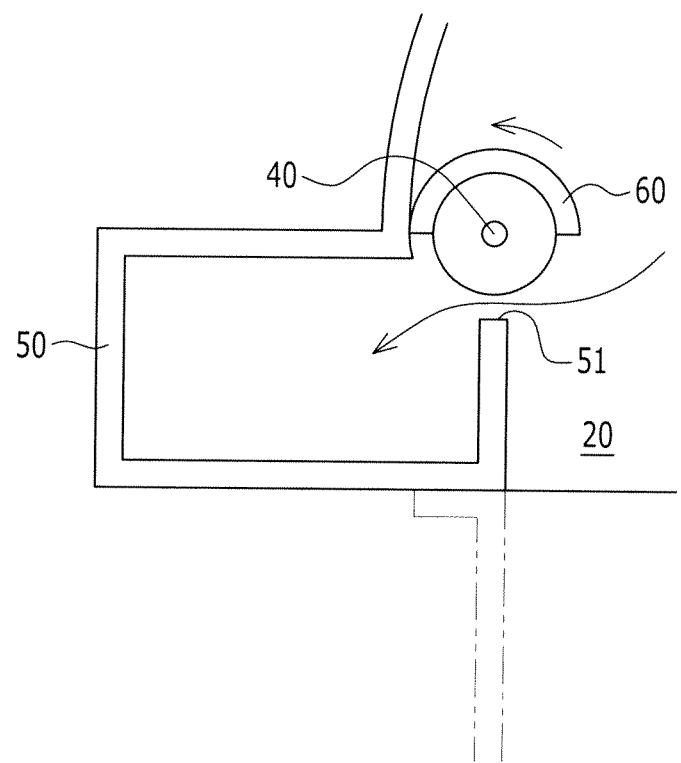

As shown in FIG. 7, while the piston 12 is positioned at a bottom dead center, the balance weight 60 of the balance shaft 40 completely opens the inlet 51. Accordingly, the pressure within the crank case 20 that is formed during the descent of the piston 12 is absorbed by the chamber 50 through the inlet 51. A pressure variation volume is increased as much as that of the chamber 50 such that the crank case 20 effectively absorbs the pressure variation.

Figure 8:
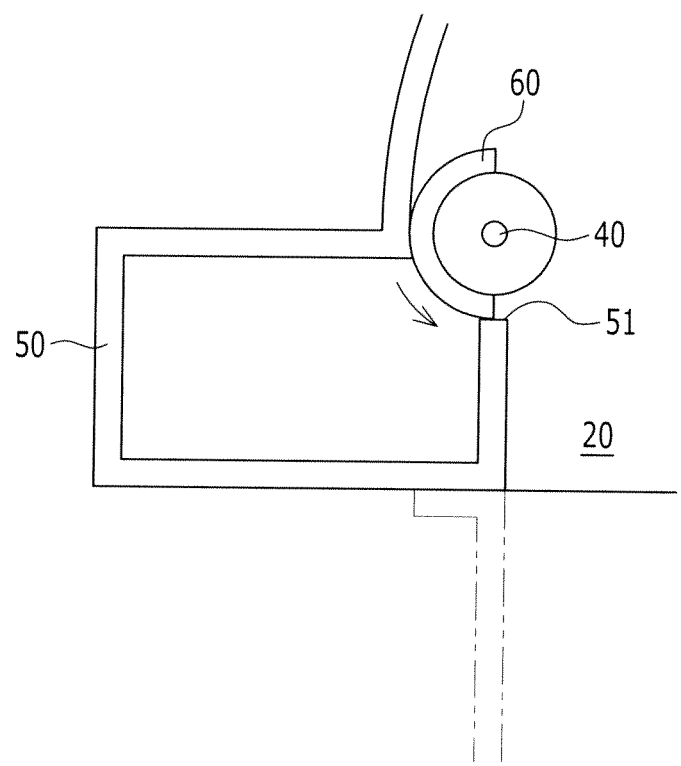

As shown in FIG. 8, when the piston 12 is positioned at a bottom dead center, the balance weight opens the inlet 51, and while the balance shaft 40 is being rotated, the balance weight 60 of the balance shaft 40 starts to close the inlet 51. Accordingly, the pressure loss within the crank case 20 that starts to be formed during the rise of the piston 12 starts to be cut off by the balance weight 60.

As described above, an exemplary embodiment of the present invention includes the chamber 50 that is formed at one side of the crank case, wherein the inlet 51 of the chamber 50 is opened/closed by the balance weight 60 to suppress a pressure within the crank case 20 such that the blow by gas is effectively circulated to the intake system without enlarging the crank case 20 or a blow by passage.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An engine having a crank case of a variable volume, comprising:
    a crankshaft that is disposed in a crank case and is connected to a piston through a connecting rod, which reciprocate in a cylinder;
    a balance shaft that is disposed in the crank case and is operated by the crankshaft;
    a chamber that is extended from the crank case; and
    a balance weight that is formed on the balance shaft and selectively opens or closes a fluid communication between the chamber and the crank case according to a position of the piston.

2. The engine having the crank case of the variable volume of claim 1, wherein the crankshaft includes a drive gear and the balance shaft includes a driven gear that is engaged with the drive gear.

3. The engine having the crank case of the variable volume of claim 1, wherein the chamber is fluid-connected to the crank case through an inlet, the balance shaft is disposed at a side of the inlet, and the balance weight is formed to have a half circle shape along an exterior circumference direction of the balance shaft.

4. The engine having the crank case of the variable volume of claim 3, wherein the balance weight has an equal radial width along the exterior circumference of the balance shaft to rotatably contact with the inlet.

5. The engine having the crank case of the variable volume of claim 3, wherein the chamber is disposed in a length direction of the crankshaft to be connected to the crank case, the inlet is formed between the chamber and the crank case in a length direction of the balance shaft, and the balance weight is disposed in a length direction of the balance shaft corresponding to the inlet.

6. The engine having the crank case of the variable volume of claim 1, wherein the fluid communication between the chamber and the crank case is closed when the piston is at a top dead center.

7. The engine having the crank case of the variable volume of claim 1, wherein the fluid communication between the chamber and the crank case opens when the piston is at a bottom dead center.

\* \* \* \* \*